C. M. RAYMOND.
BALL BEARING WHEEL.
APPLICATION FILED FEB. 26, 1910.
963,650.
Patented July 5, 1910.
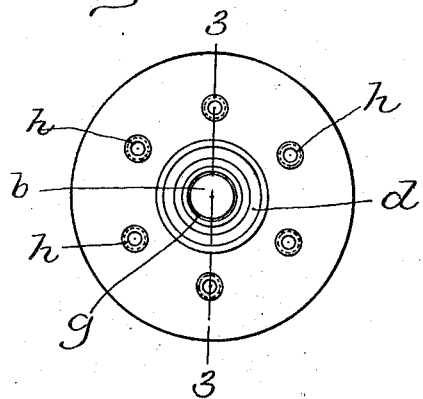
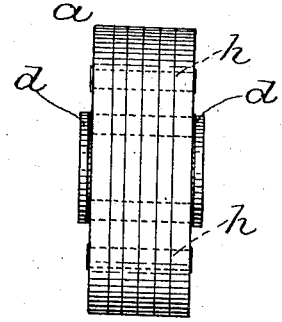
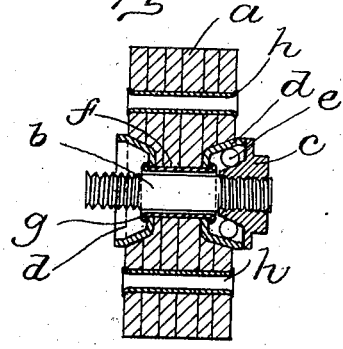
Witnesses:
Inventor
C. M. Raymond
Attys.

UNITED STATES PATENT OFFICE.

CADWALLADER M. RAYMOND, OF SOMERVILLE, MASSACHUSETTS, ASSIGNOR TO AMERICAN SKATE COMPANY, OF BOSTON, MASSACHUSETTS, A CORPORATION OF MASSACHUSETTS.

BALL-BEARING WHEEL.

963,650.

Specification of Letters Patent.

Patented July 5, 1910.

Application filed February 26, 1910. Serial No. 546,067.

*To all whom it may concern:*

Be it known that I, CADWALLADER M. RAYMOND, of Somerville, in the county of Middlesex and State of Massachusetts, have invented certain new and useful Improvements in Ball-Bearing Wheels, of which the following is a specification.

This invention relates to improvements in ball-bearing wheels or rollers, and particularly relates to such rollers as are used in roller skates.

Furthermore this invention relates to that class of wheels or rollers used in skates or other articles or mechanical contrivances which are made of material softer than steel or iron.

My invention has two main objects, one of which is to devise a secure and permanent mode of attaching the cups or bearings for ball races in a wheel or roller of a material which is less hard and strong, or more susceptible to atmospheric changes than steel, and secondly in a mode of construction of a laminated wheel or roller by means of which the disks or laminæ from which the roller is built up are firmly united together.

The wheel or roller to which the invention relates may be made of a number of thin disks of a great variety of materials, such as wood, fiber, soft metal, or a combination of any of these materials, or other material similar to them, built into a composite whole; but it is not necessarily as respects one feature of my invention at least, for the invention applies in part to a solid wheel. In providing ball bearings for a roller or wheel made of such materials, and similarly for a wheel cut or turned from a single piece of the comparatively soft material, that is, for a solid, one-piece wheel as well as a laminated one, it is necessary to supply ball cups or races of solid hard material such as case-hardened steel, and up to this time great difficulty has been experienced in securing such ball cups in a rigid manner in the roller, made of wood or other material that changes shape by absorption or loss of moisture, while, at the same time, enabling the ball cups to be constructed economically enough to be commercially practical. When such cups are so made that they may be held in a roller by friction, it is found that after a comparatively short term of use, they become loose and slip out or are displaced from their proper position with relation to the roller as a whole. This is due to the lack of sufficient toughness and rigidity in the material to hold the cups and to the swelling, shrinking and warping of the material when such material is wood, fiber, hemecite, or the like. Accordingly in carrying out one object of my invention I have devised a mode of securing ball cups in opposite sides of the roller, the preferred form of which is illustrated in the accompanying drawings, and described and claimed in the following specification.

In connection with the second object above-named, wherein the roller or wheel is made up of a number of disks or laminæ placed side by side, difficulty has been encountered in holding these disks or laminæ tightly together, and it has been found that in many instances there is a tendency for the members to separate and pull apart, due to warping on account of different atmospheric conditions as to moisture etc., and also on account of unequal stress to which they are subjected in use.

In the accompanying drawings I have illustrated a roller illustrating the preferred means which I employ to overcome previous defects and put into operation the above-named objects of my invention.

Figure 1 represents a side elevation of a wheel or roller illustrating the invention. Fig. 2 represents an edge elevation of the same. Fig. 3 represents a cross-section on the line 3—3 of Fig. 1.

The same reference characters indicate the same parts in all the figures.

Referring to the drawings I have shown a wheel designed especially for use in a roller skate, which, as appears from Figs. 2 and 3, is composite or laminated, being made of a number of circular disks of equal diameter, placed side by side. Various materials may be employed, in some instances wood, in others indurated fiber or the like, and in others, a soft or light metal such as aluminum, or a combination of any or all of these materials and of others of like nature. One form of roller which I consider good has its outermost disks or laminæ of the light metal, and the interior disks of wood, fiber or the like. Wheels of this character are very desirable in roller skates, on account of their lightness and elasticity, resilience and liveliness, but in order that they may be sufficiently light running, they must turn on ball or roller bearings. The arrangement of the wheel or roller with a ball bearing is illustrated in Fig. 3, the axle of the wheel being represented by $b$ and carrying adjustable cones $c$ between which and cups $d$ are contained the balls $e$. These cups are made of hard material such as tool or case-hardened steel, and are set into the opposite faces of the roller. Difficulty has been experienced in retaining the cups in place and in preventing them from becoming displaced out of the exact center of the roller. Many modes of securing the cups in the roller have been tried, none of which, however, so far as I am aware, has been permanently successful or sufficiently economical to enable the rollers to be marketable. One of these modes has been to drive the cups into the sides of the roller with a tight fit and depend upon friction to retain them, but with this mode of attachment the cups quickly work loose and cause trouble. The mode which I have devised of securing the cups and which constitutes one of the features of this invention consists in connecting the two cups which are set into opposite sides of the roller by means of a tubular rivet, eyelet, or thimble, the latter being of sufficient internal diameter to receive the axle $b$ freely and sufficiently small in external diameter to pass at its ends through the central perforations of the bottoms of the cups. The ends of the tubular rivet or eyelet are headed or flanged over to form the lips $g$, which overlie the edges of the perforations of the bottoms of the cups and which also are headed over with sufficient force to exert a continual inward pull on both cups. The latter are preferably made as shown in Fig. 3, with somewhat of a taper externally, so that they are enabled to be brought into tight engagement with the walls of the recesses in the faces of the roller wherein they are set, and as a consequence of which also they are forced more tightly and into firmer engagement with the roller in proportion to the pressure applied in flanging over the eyelet. This mode of attaching the cups absolutely prevents either cup from falling out, and at the same time it holds the cups from any serious deflection or displacement in case they should become loosened after extended use.

The other aspect of my invention relates to the means employed for securing the disks $a$ of a laminated wheel or roller together. These disks are coated with glue at their flat faces and laid side by side, being pressed tightly together until the glue dries. When of wood, the disks are assembled with the grain of one crossing the other, so that the end of the wood is constantly in contact with the floor, which causes it to wear perfectly round and true. This mode of fastening, however, will not prevent the disks from separating when they become warped, or when unequal stresses are applied to them. I have therefore devised an additional mode of securing them together in such a rigid and permanent manner that they can never become separated under ordinary conditions of use. This means consists of a number of eyelets or tubular rivets $h$, which are caused to penetrate the roller from one side to the other, passing through all the disks, and are headed or flanged over at their ends.

Although, as previously stated, the roller or wheel above described is especially designed for use in roller skates, I desire it to be understood that it is capable of a more extended and diverse use than that, and therefore that I do not limit the invention to merely an improvement in roller skates, but contemplate its employment in any mechanical uses to which it may be adapted.

I claim,—

1. A laminated ball bearing wheel or roller, comprising a plurality of disks placed side by side so as to form together a wheel, ball cups mounted centrally in the outer disks, said cups being perforated to admit the axle of the wheel, and a tubular fastener arranged axially in said wheel and having its ends passing through the perforations of the cups and headed over within the latter, to hold the cups in the wheel and bind the disks of the wheel together.

2. A laminated wheel or roller, comprising a plurality of disks in contact with one another, a plurality of eyelets or tubular rivets passing through said disks parallel to the axis thereof, and having enlarged ends to bind said disks together, ball races arranged centrally in the opposite faces of the wheel, and a tube occupying the center of the wheel having enlargements on its ends lying within said cups.

3. In a roller skate the combination of an axle, a wheel or roller comprising a plurality of disks, tubular rivets or eyelets passing through said disks parallel to the axis of the wheel and enlarged at their ends to bind said disks together, ball races or cups surrounding said axle and engaged with the wheel at the opposite sides thereof, a sleeve surrounding the axle and contained in the center of said wheel, external enlargements on the ends of said sleeve lying within said cups, and bearing against the bottoms thereof, cones threaded upon such axle and extending into said cups, and series of balls contained between said cones and the walls of the cups.

In testimony whereof I have affixed my signature, in presence of two witnesses.

CADWALLADER M. RAYMOND.

Witnesses:
P. W. PEZZETTI,
ARTHUR H. BROWN.